Oct. 30, 1928.
I. L. CAPERS
1,689,477
AIR TRAP FOR PIPE LINES
Filed Sept. 7, 1927    2 Sheets-Sheet 1
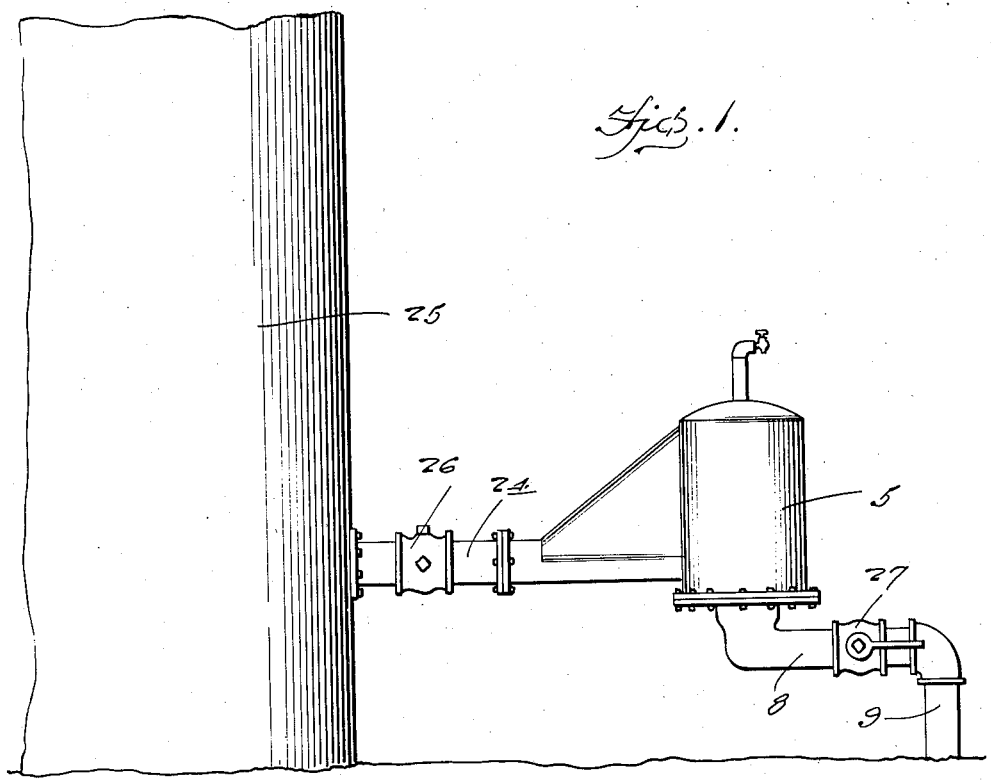
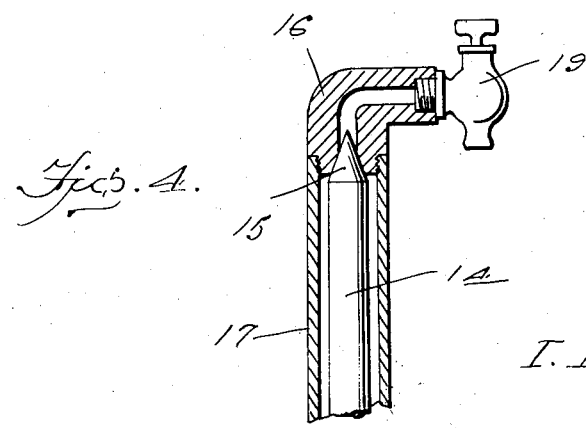
Inventor
I. L. Capers
By Clarence A. O'Brien
Attorney Oct. 30, 1928.
I. L. CAPERS
1,689,477
AIR TRAP FOR PIPE LINES
Filed Sept. 7, 1927　　2 Sheets-Sheet 2
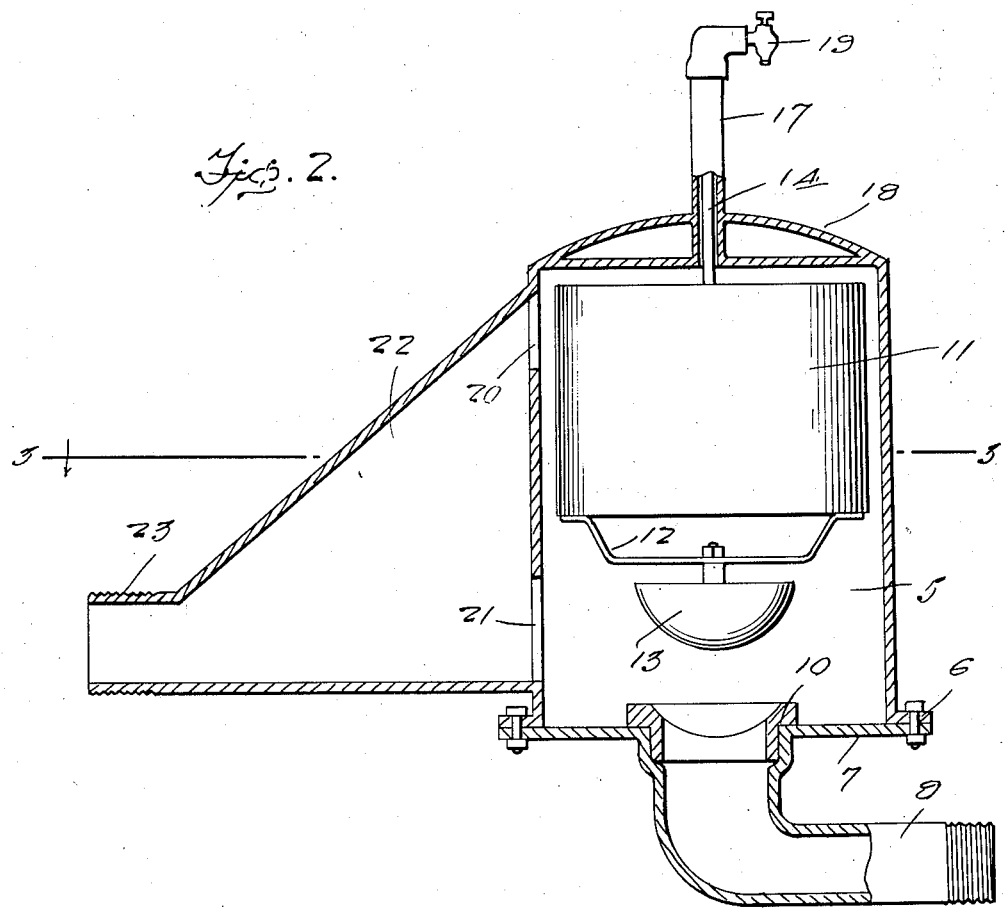
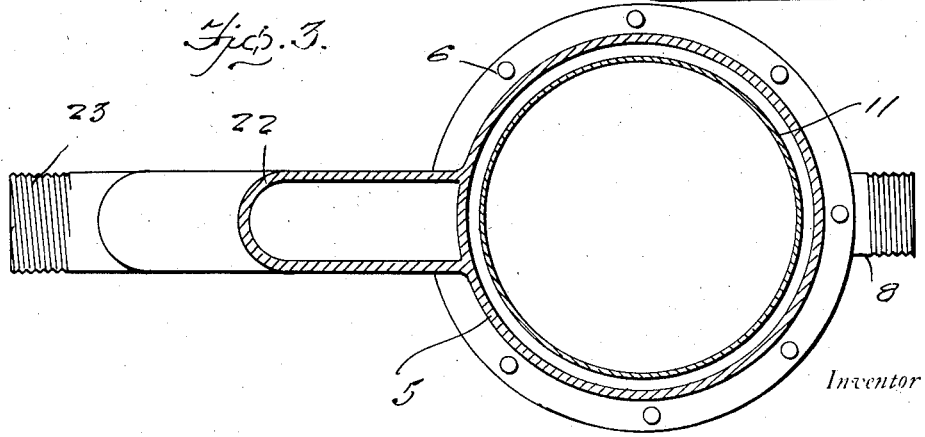
Inventor
I. L. Capers
By Clarence A. O'Brien
Attorney Patented Oct. 30, 1928.

1,689,477

UNITED STATES PATENT OFFICE.

ISAAC LEONIDAS CAPERS, OF EASTLAND, TEXAS, ASSIGNOR TO CHARLES EDGAR CAPERS, OF AMARILLO, TEXAS.

AIR TRAP FOR PIPE LINES.

Application filed September 7, 1927. Serial No. 218,085.

This invention relates to automatic air traps for gravity feed pipe lines and has for its principal object to provide means for excluding air from the pipe line upon the draining of the tank feeding into the line so as to maintain the siphoning effect of the fluid passing through the line and thus permit the same to be piped over an area which may be of a higher elevation than the tank feeding the line, after the liquid has been initially forced through the line as by means of a pump or the like, the air trap serving to exclude air from the pipe line so as to enable the siphoning action to be continuously maintained without resorting to a further force feed action.

A further object is to provide an automatic air trap of simple and practical construction, which may be easily and quickly interposed in the pipe line, between the same and the supply of fuel feeding therein without necessitating any material alterations in the connections therewith, which is efficient and reliable in performance, automatic in its operation, inexpensive to manufacture and install, and otherwise well adapted for the purposes for which the same is intended.

Other objects and advantages reside in the special construction and combination of the various elements forming the invention, reference being made to the accompanying drawings forming a part hereof, wherein:—

Figure 1 is an elevational view of a section of pipe line connected with a supply tank and having my air trap interposed therein.

Figure 2 is a vertical sectional view through the trap.

Figure 3 is a horizontal sectional view taken along a line 3—3 of Figure 2, and, Figure 4 is a vertical sectional view of the air cut-off valve.

Referring now to the drawings in detail, my invention comprises a substantially cylindrical housing indicated at 5 having its lower end open with the lower edge thereof formed into an annular flange 6. The lower end of the housing is closed by a flange 7 formed at one end on an elbow 8 adapted to be connected with one of the pipe line sections 9.

The elbow opens into the lower portion of the housing with a valve seat 10 fitted into the opening extending within the same. A float 11 is arranged within the housing having a bracket 12 attached to its lower end to which is secured a valve 13. The upper end of the float is provided with a stem 14 having its upper end formed into a needle valve 15 arranged to seat within the opening of an elbow 16 attached at the upper end of a pipe 17 extending upwardly from the top portion 18 of the housing. A petcock 19 is attached to the elbow 16 whereby to close communication therethrough.

Upper and lower openings 20 and 21 respectively are formed at one side of the housing communicating with a hollow offset 22 integrally formed on the housing and extending horizontally from the side thereof provided with said opening. The offset 22 tapers outwardly into a tubular threaded end 23 by means of which the same is attached to a pipe section 24 communicating with a supply tank 25.

Cut-off valves 26 and 27 are interposed respectively in the pipe line communicating between the pipe section 24 and the tank 25 and between the elbow 8 and the section 9 of the pipe line.

In order to feed the contents of the tank 25 through the pipe line 9, after such pipe line has first been filled with a quantity of the liquid as by means of a force feed device which will force the air from the pipe line as the liquid is fed therein, and after closing the cut-off valve 27, the petcock 19 is opened together with the cut-off valve 26 permitting any air in the trap housing 5 to be forced from the housing as the liquid enters the same. As soon as the liquid fills the housing, indicating that all air has been expelled therefrom, the float will then be disposed in its uppermost position serving to close the needle valve and the valve 27 may then be opened thus permitting the liquid to pass from the tank. As soon as the liquid in the tank has been reduced to a level permitting the float 11 to lower, the valve 13 will close communication through the elbow 8 thus stopping the further flow of liquid. The valve 13 being disposed below the float will operate to cause the valve to close before any air from the tank 25 can enter the elbow or into the pipe line. After the low level of the tank has been reached, the valve 27 may be closed as a safeguard against admitting any air into the pipe line when the trap is again placed in operation.

The apparatus is particularly adapted for use in oil pipe lines which extend for a considerable distance across country and which have certain sections thereof elevated above the tank 25 from which the oil is fed. By first filling the pipe line with a quantity of oil and then placing the air trap in operation, the oil will be continued to be fed through the pipe line by a siphoning action as long as air is excluded from the line and without necessitating a further filling of the pipe line after the tank has been emptied.

It is obvious that the invention is susceptible to various changes and modifications without departing from the spirit or scope of the invention as hereinafter claimed or sacrificing any of its advantages, and I accordingly claim all such forms of the device to which I am entitled.

I claim:—

In an automatic cut off for pipe line comprising an air trap having a trap chamber provided with an air discharge port in its upper end, a pipe line connection at its lower end, a pair of intake ports one adjacent each end, an offset formed at one side of the trap adapted to provide communication between the supply tank and each of said intake ports, a float arranged in the chamber, a valve carried at its upper end controlling communication with said air discharge port and a valve at its lower end controlling communication with said pipe line, said valve being disposed for opposite actuation upon the opposite movement of the float, said air discharge port also being provided with the manually operable valve permitting closure thereof under certain predetermined conditions.

In testimony whereof I affix my signature.

ISAAC LEONIDAS CAPERS.